United States Patent
Creeth et al.

(10) Patent No.: US 10,541,422 B2
(45) Date of Patent: Jan. 21, 2020

(54) CATHODE ELECTRODE MATERIAL INCLUDING A POROUS SKELETAL MEDIUM COMPRISING A MODIFIED SURFACE

(75) Inventors: Andy Creeth, Cheshire (GB); Nick Baynes, Cheshire (GB); Andy Potter, Cheshire (GB); Craig P. Dawson, Cheshire (GB); Clare Louise Downs, Cheshire (GB)

(73) Assignee: University of Chester, Chester (GB)

( * ) Notice: Subject to any disclaimer, the term of this patent is extended or adjusted under 35 U.S.C. 154(b) by 76 days.

(21) Appl. No.: 14/127,764

(22) PCT Filed: Jun. 22, 2012

(86) PCT No.: PCT/GB2012/051474
§ 371 (c)(1),
(2), (4) Date: Mar. 21, 2014

(87) PCT Pub. No.: WO2012/175997
PCT Pub. Date: Dec. 27, 2012

(65) Prior Publication Data
US 2014/0205931 A1   Jul. 24, 2014

(30) Foreign Application Priority Data
Jun. 22, 2011   (GB) .................................. 1110585.5

(51) Int. Cl.
*H01M 4/86* (2006.01)
*H01M 4/88* (2006.01)

(52) U.S. Cl.
CPC ....... *H01M 4/8626* (2013.01); *H01M 4/8803* (2013.01)

(58) Field of Classification Search
CPC ............. H01M 8/1002; H01M 8/1097; H01M 8/1206; H01M 8/1226; H01M 4/8621;
(Continued)

(56) References Cited

U.S. PATENT DOCUMENTS 3,077,507 A * 2/1963 Kordesch ................ H01M 4/96
429/522
3,242,011 A    3/1966 Witherspoon
(Continued)

FOREIGN PATENT DOCUMENTS

EP          1059686 A2    12/2000
EP          1274144 A2    1/2003
(Continued)

OTHER PUBLICATIONS

Search Report dated Aug. 19, 2011 in corresponding GB application No. GB1110585.5.
(Continued)

*Primary Examiner* — Kenneth J Douyette
(74) *Attorney, Agent, or Firm* — Knobbe, Martens, Olson & Bear, LLP

(57) ABSTRACT

There is provided a fuel cell cathode electrode, comprising a porous skeletal medium, the surface of which medium is modified or otherwise arranged or constructed to induce enhanced activated behaviour, wherein the enhanced activated behaviour is induced by means of increasing the surface area for a given volume of the electrode and/or by increasing the number and/or availability of reactive sites on the electrode. A fuel cell having such a cathode electrode, a method of manufacturing such a cathode electrode, and use of such a cathode electrode in a fuel cell is also disclosed.

12 Claims, 13 Drawing Sheets

(58) Field of Classification Search
CPC ............ H01M 4/8636; H01M 4/8637; H01M 4/8803; H01M 4/8813
See application file for complete search history.

(56) References Cited

U.S. PATENT DOCUMENTS

| | | | |
|---|---|---|---|
| 3,378,406 A | | 4/1968 | Rosansky |
| 3,400,019 A | * | 9/1968 | Le Duc ................... H01M 4/86 257/40 |
| 3,425,875 A | | 2/1969 | Adlhart et al. |
| 3,660,165 A | | 5/1972 | Palmer |
| 4,465,576 A | | 8/1984 | Negishi et al. |
| 5,126,216 A | | 6/1992 | Capuano et al. |
| 5,879,828 A | | 3/1999 | Debe |
| 6,103,393 A | | 8/2000 | Kodas et al. |
| 6,136,412 A | | 10/2000 | Spiewak |
| 6,312,845 B1 | | 11/2001 | Scortichini |
| 6,444,347 B1 | | 9/2002 | Ouvry et al. |
| 2002/0176927 A1 | | 11/2002 | Kodas et al. |
| 2003/0031917 A1 | | 2/2003 | Katori et al. |
| 2005/0070427 A1 | | 3/2005 | Pak |
| 2005/0129504 A1 | | 6/2005 | Pak et al. |
| 2006/0154126 A1 | * | 7/2006 | Ritts ................... H01M 4/9041 429/401 |
| 2006/0166811 A1 | | 7/2006 | Huang et al. |
| 2006/0177708 A1 | * | 8/2006 | Koyama ........... H01M 8/04194 429/450 |
| 2006/0233692 A1 | * | 10/2006 | Scaringe ................ B82Y 30/00 423/335 |
| 2007/0003820 A1 | | 1/2007 | Kraytsberg |
| 2007/0037039 A1 | | 2/2007 | Chondroudis et al. |
| 2007/0059585 A1 | | 3/2007 | Yoo et al. |
| 2007/0092784 A1 | | 4/2007 | Dopp et al. |
| 2007/0122686 A1 | | 5/2007 | Alexey et al. |
| 2007/0134531 A1 | * | 6/2007 | Kimura ................. H01M 8/006 429/483 |
| 2007/0178310 A1 | | 8/2007 | Istvan |
| 2008/0044719 A1 | | 2/2008 | Gorer et al. |
| 2008/0063924 A1 | | 3/2008 | O'Hara |
| 2008/0199975 A1 | | 8/2008 | Shin et al. |
| 2009/0023036 A1 | | 1/2009 | Liu et al. |
| 2009/0068545 A1 | * | 3/2009 | Kim ....................... B82Y 30/00 429/530 |
| 2009/0197137 A1 | | 8/2009 | Lee et al. |
| 2009/0208751 A1 | | 8/2009 | Green et al. |
| 2009/0208780 A1 | | 8/2009 | Atanassova et al. |
| 2009/0305083 A1 | * | 12/2009 | Karamanev ....... H01M 8/04186 429/2 |

FOREIGN PATENT DOCUMENTS

| | | |
|---|---|---|
| EP | 1615279 A2 | 1/2006 |
| EP | 1662597 A1 | 5/2006 |
| EP | 1786053 A2 | 5/2007 |
| EP | 2228857 A1 | 9/2010 |
| GB | 2184593 A | 6/1987 |
| GB | 2298955 A | 9/1996 |
| JP | 2004-152593 A | 5/2004 |
| JP | 2005-267981 A | 9/2005 |
| JP | 2007-165120 A | 6/2007 |
| JP | 2010-129393 A | 6/2010 |
| WO | 01/17050 A1 | 3/2001 |
| WO | 02/09214 A1 | 1/2002 |
| WO | 02/29836 A1 | 4/2002 |
| WO | 2004/102722 A2 | 11/2004 |
| WO | 2005/078833 A | 8/2005 |
| WO | 20051091416 A2 | 9/2005 |
| WO | 2009/148114 A1 | 12/2009 |

OTHER PUBLICATIONS

Search Report and Written Opinion dated Jan. 30, 2013 in corresponding Int'l application No. PCT/GB2012/051474.
European Office Action for Application No. 12 730 253.7 dated Mar. 23, 2016 in 8 pages.
Japanese Office Action for Application No. 2014-516446 dated Apr. 5, 2016 in 8 pages.
Japanese Office Action for Application No. 2014-516446 dated Apr. 4, 2017 in 4 pages.
European Office Action for Application No. EP12730253.7, dated Oct. 22, 2018 in 6 pages.
Japanese Office Action for Application No. 2014-516446, dated Jan. 29, 2019 in 7 pages.
Japanese Office Action for Application No. 2018-033142, dated Mar. 19, 2019 in 10 pages.

* cited by examiner

CATHODE ELECTRODE MATERIAL INCLUDING A POROUS SKELETAL MEDIUM COMPRISING A MODIFIED SURFACE

CROSS-REFERENCE TO RELATED APPLICATIONS

This application is the U.S. National Phase under 35. U.S.C. § 371 of International Application PCT/GB2012/051474, filed Jun. 22, 2012, which claims priority to U.K. Patent Application No. 1110585.5, filed Jun. 22, 2011. The disclosures of the above-described applications are hereby incorporated by reference in their entirety.

The present invention generally relates to a fuel cell cathode electrode and, more particularly, to a cathode electrode the surface of which is modified or otherwise arranged or constructed to induce enhanced activated behaviour. A method of manufacturing such a cathode electrode is also disclosed. Further, a fuel cell having a cathode electrode of this type is also described. Use of such a cathode electrode in a fuel cell is also provided.

Cathode electrodes have been used for many years in applications such as fuel cells, for instance, and their technology is well understood. In particular applications, carbon through-flow electrodes may be used as the cathode. The primary tasks of such electrodes are providing a surface area upon which electrochemical reactions can occur; transporting electrons to and from the electrode/liquid interface into the external electrical circuit, via bipolar or monopolar plates; supporting the fragile polymer electrolyte membrane; and enabling optimal flow of reactants through the electrode.

An example of an electrode of this type is shown in FIG. 1. From FIG. 1, it can be seen that the electrode, generally indicated 1, is constituted by a porous electrode material 3 which is in between a membrane 7 and a bipolar plate 9. The flow of catholyte liquid is indicated by arrows 5.

If the electrode fails to perform any of its primary functions (described above), this will result in either a reduced electrochemical reaction rate or possible damage to the cell components.

Various materials have been suggested and used to make cathode electrodes, but suffer from numerous disadvantages which include poor surface area availability and poor conductivity.

For example, rigid carbon electrodes, such as reticulated vitreous carbon (RVC) electrodes suffer from relatively poor surface area availability for reaction when compared with alternative electrode materials. A further disadvantage of RVC electrodes is that the sharp points of the strand ends of the electrodes can cause punctures and short-circuits through the polymer electrolyte membrane. It is also difficult to make RVC electrodes to a sufficiently slim configuration.

Softer fibre-based electrodes, such as carbon felts, offer higher surface areas than RVC, but lower electrical conductivity. Increased compression of the felts within the electrode cavity was previously known to help increase electrical conductivity, but this is often accompanied with increased resistance to fluid flow, increasing the energy required to pump an electrolyte through the material. Additionally, such compressive forces can lead to damage of the felt materials by breakage of the carbon fibres.

Other materials include high surface area activated carbons, similar to those used in catalyst inks printed onto the anode of a fuel cell, but these are not conducive to allowing significant liquid electrolyte flow through the micro- and nano-scale pore structure, which is highly undesirable.

From the discussion that is to follow, it will become apparent how the present invention addresses the aforementioned deficiencies associated with known arrangements while providing numerous additional advantages not hitherto contemplated or possible with prior art constructions.

According to a first aspect of the present invention, there is provided a fuel cell cathode electrode, comprising a porous skeletal medium, the surface of which medium is modified or otherwise arranged or constructed to induce enhanced activated behaviour, by means of increasing the surface area for a given volume of the electrode and/or by increasing the number and/or availability of reactive sites on the electrode.

A desirable electrode material may be realised by the modification of available materials to obtain electrode materials that fulfil the requirements of a fuel cell electrode (as discussed above). It may be advantageous to begin with an electrode structure that provides the electrical conductivity, liquid electrolyte flow distribution and membrane support required by the application and modifying its surface to an extent sufficient to achieve significant performance improvements.

By 'induce enhanced activated behaviour', it is meant that the cathode electrode performs with greater efficiency than the same electrode would in the absence of the said modification, arrangement or construction so that more power may be generated from the same volume of electrode, for instance. Modification of the surface may be achieved in various ways. For example, a first technique may be to increase the effective surface area of the electrode. Another way may be to alter the surface chemistry of the electrode so that the likelihood of specific functional groups presenting at the electrode surface is enhanced, increasing the proportion of the electrode surface that is available for reaction.

By 'or otherwise arranged or constructed' it will be understood that the porous electrode material comprises the requisite properties as defined herein to induce enhanced activated behaviour. These requisite properties may include (among others) for example having a sufficiently high surface area availability for reaction with the reactants and/or having a sufficiently high number of reactive sites on the surface to encourage reactive behaviour, and other associated or independent properties referred to in the claims which follow.

It will be understood that in one or more embodiments, the porous electrode material (skeletal medium) may comprise existing materials which have the requisite properties for effecting enhanced activated behaviour as described herein. This may include, for example, an unmodified substrate or porous electrode medium, which can equally be used in a fuel cell application and induce enhanced activated behaviour by virtue of its inherent advantageous properties. In other words, the invention may be effected, in some embodiments, without modification of the porous skeletal medium. In this way, the porous skeletal medium may be 'otherwise arranged or constructed'.

Fuel cells have been known for portable applications such as automotive and portable electronics technology for very many years, although it is only in recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, air or oxygen as oxidant and the product of the reaction is water. The gases are fed respectively into catalysing, diffusion-type electrodes separated by a solid or liquid electrolyte which carries electrically charged particles between the two electrodes. In an indirect or redox fuel cell, the oxidant (and/or fuel in some cases) is not reacted directly at the electrode but instead reacts with the reduced form (oxidised form for fuel) of a redox couple to oxidise it, and this oxidised species is fed to the cathode.

The point of particular interest in relation to the present invention is the reaction which takes place at the cathode region (electrode) of the cell. By altering the surface chemistry of the electrode, enhanced electrochemical reactions can be achieved, thereby enhancing the productivity and/or efficiency of the electrode.

Cathode electrodes as defined in claim 1 may be particularly effective in fuel technology applications such as back-up power for mobile phone masts and computer systems requiring around 2 to 10 kW power; stationary power such as replacing a diesel engine genset for off-grid applications or larger back-up power; and transport applications including automotive.

The enhanced activated behaviour is induced by means of increasing the surface area for a given volume of the electrode and/or by increasing the number and/or availability of reactive sites on the electrode, the latter increasing the effective surface area for the electrochemical reaction.

It may be that the surface modification of the porous skeletal medium includes at least one increased surface area zone. In other words, the modification acts to increase the surface area of the electrode. A physical increase in the amount of surface electrode material exposed to the reactants will result in more opportunities for electrochemical reactions to occur.

The surface modification of the medium may include the provision of a sputtered coating of carbon. Using a sputtering technique, it is possible to deposit small particles of active electrode material (for example, carbon) onto the support structure (porous skeletal medium). Advantageously, control of the parameters used in the coating process may grant control of the morphology of the deposited particles. Control of the morphology enables the amount of surface area exposed to the reactants to be optimised.

Additionally or alternatively, the surface modification of the medium may include physisorbed carbon. This type of surface modification involves the addition of carbon particles chosen for their high surface area or electrochemical properties. The ability to choose the type of additional carbon deposited gives a high degree of control to the surface activation procedure. Specific high surface area carbons can be chosen that maximise the reactivity for a particular catholyte.

Additionally or alternatively, the surface modification of the medium may include the provision of deposits of templated carbon. This technique involves the use of a templating precursor prior to the addition of carbon. As well as increasing the surface area of the electrode, this technique allows for a great deal of control in both electrode surface morphology (through choice of template) and electrode surface chemistry (through choice of carbon precursor and treatment conditions).

Additionally or alternatively, the surface modification of the medium may include the provision of chemical vapour deposited carbon. Chemical vapour deposition (CVD) techniques can be utilised to 'grow' additional carbon structures using the surface of the porous skeletal medium as a support skeleton. Alteration and regulation of the conditions in which the additional carbon species are formed on the surface allows for tailoring of the resulting microstructure of the electrode.

Additionally or alternatively, the surface modification of the medium may include the provision of chemical vapour infiltrated carbon. Chemical vapour infiltration (CVI) techniques can be utilised to 'grow' additional carbon structures in a similar manner to CVD techniques (described above).

An efficient technique for improving the productivity and/or efficiency of the cathode electrode is to alter its surface chemistry in order for the electrode to become more reactive to the reactants. In this manner, the surface of the medium is modified to induce enhanced activated behaviour. Hence, the surface modification of the medium may include a region of increased electrochemical reactive sites per unit surface area. By increasing the number of reactive sites per unit surface area, in other words increasing the reactive site density, the likelihood of specific functional groups necessary for reaction meeting a liquid reactant is increased. A higher proportion of reactive sites increases the current and power density of the fuel cell.

Additionally or alternatively, the surface modification of the medium may include liquid chemical modification. At least one advantage of this technique is the ability to utilise low-cost commercially available treatment agents, keeping the additional cost of performing such treatments down. A further advantage is that the specific treatment agents used can be tailored to create the optimal surface modification required for a specific catholyte.

Depending on the catholyte used, the surface modification of the medium may include at least one oxidised region. By oxidising the surface of the medium, this alters its surface chemistry thereby increasing the number of reactive sites for reaction between the reactants. Of course, it will be appreciated that the surface may include numerous oxidised regions.

In at least one or more embodiments, the at least one oxidised region may be effected by exposure to a strong acid, such as nitric acid or sulphuric acid, and/or a strong oxidising agent, such as ammonium persulfate.

Additionally or alternatively, the surface modification of the medium may include gas-phase chemical modification. Gas-phase chemical modification acts to create more reactive surface sites for the reaction to occur. Particular advantages of this technique are that a gas treatment process requires no post-treatment clean up of the electrodes, good pore infiltration can be achieved and the choice of treatment gas or gases can be used to tailor the end-result surface chemistry to match the particular requirements of the catholyte solution.

It may be, for instance, that the gas-phase chemical modification is effected by oxygen plasma treatment. This may be particularly favourable depending on the catholyte used.

Additionally or alternatively, the surface modification of the medium may include plasma etching. Controlled use of a plasma to etch micropores into the surface of the porous skeletal medium may increase the surface area while keeping the flow, support and electrical conductivity of the material at a satisfactory level compared with its original state.

Additionally or alternatively, the surface modification of the medium may include heat treatment. Heat treatment of the electrode may induce micropores to alter surface chemistry of the porous skeletal medium, thereby improving the productivity of the cathode electrode. A particular advantage of this technique is that no additional reagents are required, offering a reduced complexity treatment and potentially saving on cost.

The arrangement or construction of the medium may comprise compressing the electrode. It has previously been thought that carbon electrodes in flow batteries and electrochemical reactors should only be compressed to approximately 80% of their original thickness (for example see Montiel et al. *Ind. Eng. Chem. Res.* 1998, 37, 4501-4511). However, the inventors have surprisingly found that for certain fuel cell applications some cathode materials can give optimum performance when compressed to much less than 80% of their original thickness. In some cases, optimum performance was achieved when the cathode material was compressed to less than 50% of its original thickness. Without wishing to be bound by theory, such a compression increases the conductivity of the medium and the surface area of the cathode in the region near the membrane surface. These benefits surprisingly outweigh the reduced flow that also results from the compression. Before or after compression, the electrode may or may not be further modified.

The arrangement or construction of the cathode electrode may therefore comprise compressing the porous electrode to less than 80% of its original thickness, preferably to less than 70%, more preferably to less than 60% and even more preferably to less than 50% of its original thickness.

The skilled person will recognise that the techniques mentioned hereinabove for modifying the surface chemistry of the porous skeletal medium may be used separately or in combination. It may be that combination of the techniques described above produces a synergistic effect for inducing enhanced activated behaviour of the cathode electrode which is highly desirable.

The porous skeletal medium may comprise a rigid carbon structure. This may improve the strength and robustness of the electrode while exhibiting a good electrical conductivity in all directions.

It may be that the porous skeletal medium comprises reticulated vitreous carbon (RVC). RVC is a microporous, glassy carbon electrode material. RVC offers a high ratio of surface area to volume and minimal reactivity over a wide range of processing conditions, combined with low cost and easy handling. The design of an electrochemical cell having an RVC electrode allows for uniform current and potential distribution, low ohmic internal resistance and high rates of mass transport of the electroactive species to the electrode surface.

The porous skeletal medium may comprise a soft fibre-based structure. A soft fibre-based structure may offer superior surface area exposure to the reactants.

The porous skeletal medium may comprise compressed carbon felts. The compression of the felts within the electrode may help increase electrical conductivity.

In one embodiment, the porous skeletal medium comprises a carbon/PTFE composite medium. In other embodiments, the porous skeletal medium comprises a carbon aerogel. In still further embodiments, the porous skeletal medium may comprise carbon cloths. Such carbon cloths may include a Zorflex activated carbon cloth. In still further embodiments, the porous skeletal medium may comprise carbon paper or a carbon veil.

In a further embodiment, the porous skeletal medium may comprise a carbon cloth. The inventors have surprisingly found that in some cases the weave of the cloth material may alter the performance of the cathode. Changing the weave is thought to alter the flow characteristics of the catholyte, thereby allowing performance to be tailored. Preferably, the cloth is woven or knitted.

The porous skeletal medium and/or the material with which the surface of the medium is modified may have a thickness of no more than 2 mm; more particularly, a thickness of less than 1 mm; more particularly, a thickness of less than 0.4 mm; more particularly still, a thickness of less than 0.25 mm. In this way, the thickness may range from 0.01 mm to 2 mm. A reduction in thickness is desirable as a thinner overall cell will result in a higher volumetric and gravimetric power density for the fuel cell when incorporated into an operating fuel cell system—both these parameters may be considered critical for fuel cell system design.

It may be that the porous skeletal medium takes the form of one or more panels. More particularly, the one or more panels may have dimensions of 250 mm×250 mm. Such dimensions may be particularly suitable for ease of manufacture of the electrode and ease of transport, for instance.

The surface of the porous skeletal medium may be reactive to a catholyte liquid. This is advantageous because if areas of the support material remain untreated during the process, they remain capable of performing the electrode reaction(s), albeit at a reduced capacity.

The porous skeletal medium and/or the material with which the surface of the medium is modified may have a specific surface area from 600 to 30000 $cm^2/cm^3$. In one or more embodiments, the specific surface area may be 3000 $cm^2/cm^3$. The surface area as specified is significantly higher than conventional electrodes which makes an electrode formed according to the present invention particularly suitable for enhancing the productivity of a fuel cell in terms of electrical conductivity and electricity generation.

The porous skeletal medium and/or the material with which the surface of the medium is modified may have a through-plane electrical resistance of no more than 17 $m\Omega cm^2$. More particularly, the through-plane electrical resistance may be of no more than 5 $m\Omega cm^2$. This value includes contact resistance with the bipolar plate. A low resistance is often necessary in fuel cells to reduce efficiency losses generated by electrical conduction through the relevant components of the fuel cell.

The porous skeletal medium and/or the material with which the surface of the medium is modified may be stable in an oxidising environment of pH 0 at 80° C.; alternatively or additionally, may be stable in an oxidising environment of pH 0 at 95° C.; and alternatively or additionally, may be stable in an oxidising environment of pH 0 at 120° C. A failure for the electrode structure to be stable in such environments may result in degradation of the electrode, reduced electrochemical performance and may possibly affect mechanical stability and/or contaminate the fuel cell system with corrosion products.

The fuel cells may also operate at high pressures and so the porous skeletal medium and/or the material with which the surface of the medium is modified may be stable at such pressures. Preferably, the fuel cells operate at a pressure above atmospheric (or ambient) pressure and below 5 bar absolute pressure.

The porous skeletal medium and/or the material with which the surface of the medium is modified may have a pore structure permeability of at least $5 \times 10^{11}$ $m^2$. A permeability at this level provides adequate ease of flow of liquid catholyte reactant.

The porous skeletal medium may comprise at least one of carbon or a metal. Advantageously, the present invention provides the flexibility of modifying, for instance, a carbon electrode base structure by coating it with additional carbon to enhance the effective surface area for reactivity, and/or by altering its surface chemistry by creating more active sites thereon. Additionally, the present invention also offers the capability of utilising an otherwise electrochemically unreactive structure (such as a porous metal, for instance) that otherwise offers the other requirements of an electrode, by coating it with an active carbon surface as described herein. The porous skeletal medium may, for example, comprise one or more of platinum group metals, and less-active metals including stainless steel, austenitic nickel-chromium-based superalloys and titanium.

The porous skeletal medium may be self-supporting. In this way, the porous skeletal medium does not necessarily require any further means for support and can be used as a stand-alone structure.

In another embodiment, the surface modification, arrangement or construction of the cathode electrode of the present invention results in an increased wettability of the cathode electrode. This may result in a more efficient fuel cell by reducing the pressure required to pump the catholyte, thereby reducing a parasitic loss.

In another aspect, the present invention envisages a method of manufacturing a fuel cell cathode electrode, the method comprising the steps of: providing a porous skeletal medium; and modifying or otherwise arranging or constructing the surface of the medium to induce enhanced activated behaviour.

The step of modifying the surface of the medium may include increasing the surface area of the medium.

The surface area of the medium may be increased by the provision of at least one increased surface area zone; in other words, a zone with a specific surface area greater than a neighbouring region on the same electrode, for instance.

The step of modifying the surface of the medium may involve sputter coating it with carbon particles.

In particular embodiments, the sputtering process may involve vacuum sputtering.

The step of modifying the surface of the medium may involve physisorbing carbon particles onto the medium. The physisorbing process may comprise the steps of: providing a suspension of carbon particles in a carrier; contacting the medium with the suspension of carbon particles; and evaporating the carrier so that carbon particles remain deposited on the medium by physisorption. Advantageously, using this technique the deposited particles either remain in position through physisorption and/or the method may further comprise the step of heat treating the carbon particles to adhere to the medium. Alternatively, proton conductive polymers such as Nafion® can be used as a means to attach the carbon particles. In this manner, the poor electrical conductivity that may be a restricting factor of high surface area carbons (used conventionally) is of lesser consequence since the main backbone of the porous skeletal medium will transport the electrons for the majority of the conduction pathway.

The step of modifying the surface of the medium may involve a templating method for applying carbon to the medium.

The templating method may involve the steps of: applying a template to the medium; depositing carbon over the template; and removing the template to leave carbon deposited on the surface of the medium. The template may be selected for imparting a desirable configuration of the carbon over the electrode surface.

In one or more embodiments, the template may be soluble. This may make the template easier to remove.

It may be that a template is arranged on a medium in a particular formation chosen for its intended application.

The step of modifying the surface of a medium may involve chemical vapour depositing carbon thereonto.

The step of modifying the surface of the medium may involve chemical vapour infiltration of carbon thereinto.

The step of modifying the surface of the medium may involve increasing the number of electrochemical reactive sites per unit surface area. This may enhance the productivity of the electrode and consequently the fuel cell by the generation of superior amounts of electricity when compared with conventional cathode electrode fuel cells.

The method may involve the step of liquid chemical modification to alter the surface chemistry of the medium.

The method may additionally or alternatively involve the step of oxidising the surface of the medium.

In one or more embodiments, the oxidising step may be performed using a strong acid, such as nitric acid or sulphuric acid, and/or a strong oxidising agent, such as ammonium persulfate.

The step of modifying the surface of the medium may involve gas-phase chemical modification.

The gas-phase chemical modification may be effected by oxygen plasma treatment.

A step of modifying the surface of the medium may involve plasma etching.

The plasma etching may comprise etching micropores into the surface of the medium.

The step of modifying the surface of the medium may involve heat treatment.

In another aspect, the present invention envisages a fuel cell having a cathode electrode as described herein.

The fuel cell may employ FlowCath® technology; that is a fuel cell in which hydrogen is catalysed on the anode. Electrons and protons are absorbed into a solution containing redox catalyst systems, which flow continuously from the stack to an external regeneration vessel. In the regenerator, the catholyte comes into contact with air and the electrons, protons and oxygen from air react to form water, which exits the regenerator as vapor. The catholyte then flows back to the cell.

In yet another aspect, the present invention contemplates the use of a cathode electrode as described herein in a fuel cell.

The present invention will now be described more particularly with reference to the accompanying drawings, by way of example only, in which.

Figure 7:
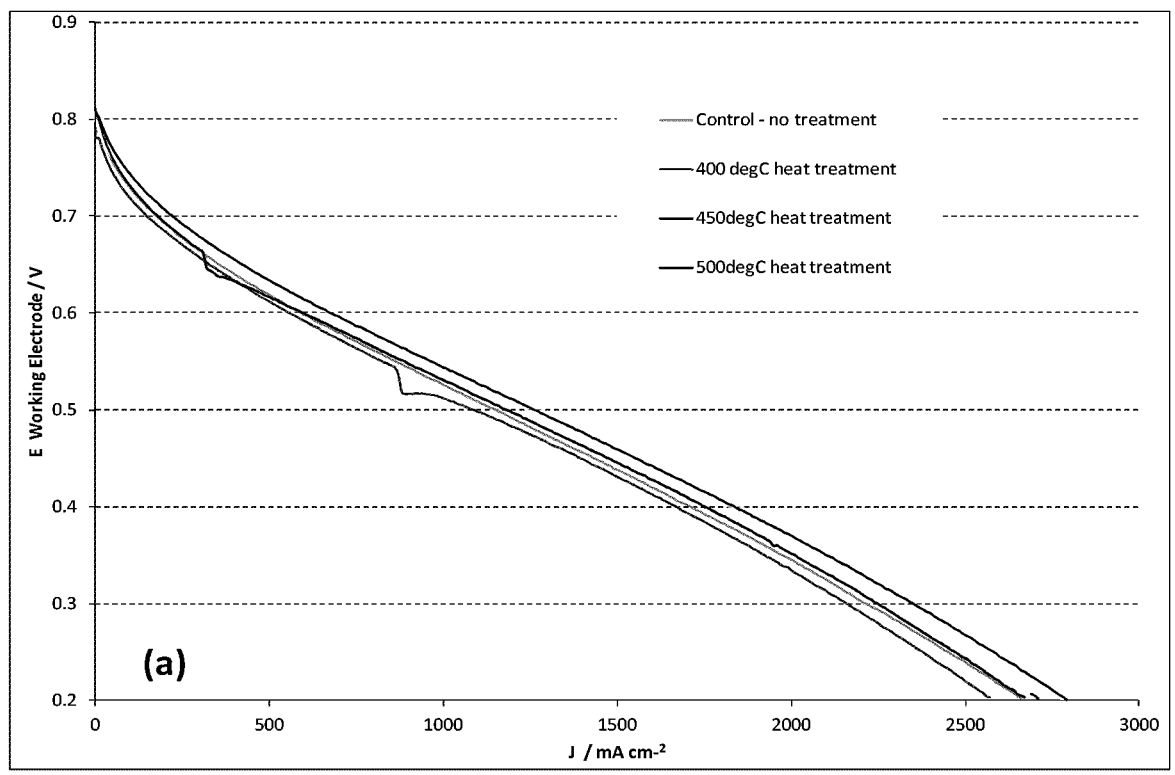
Figure 7:
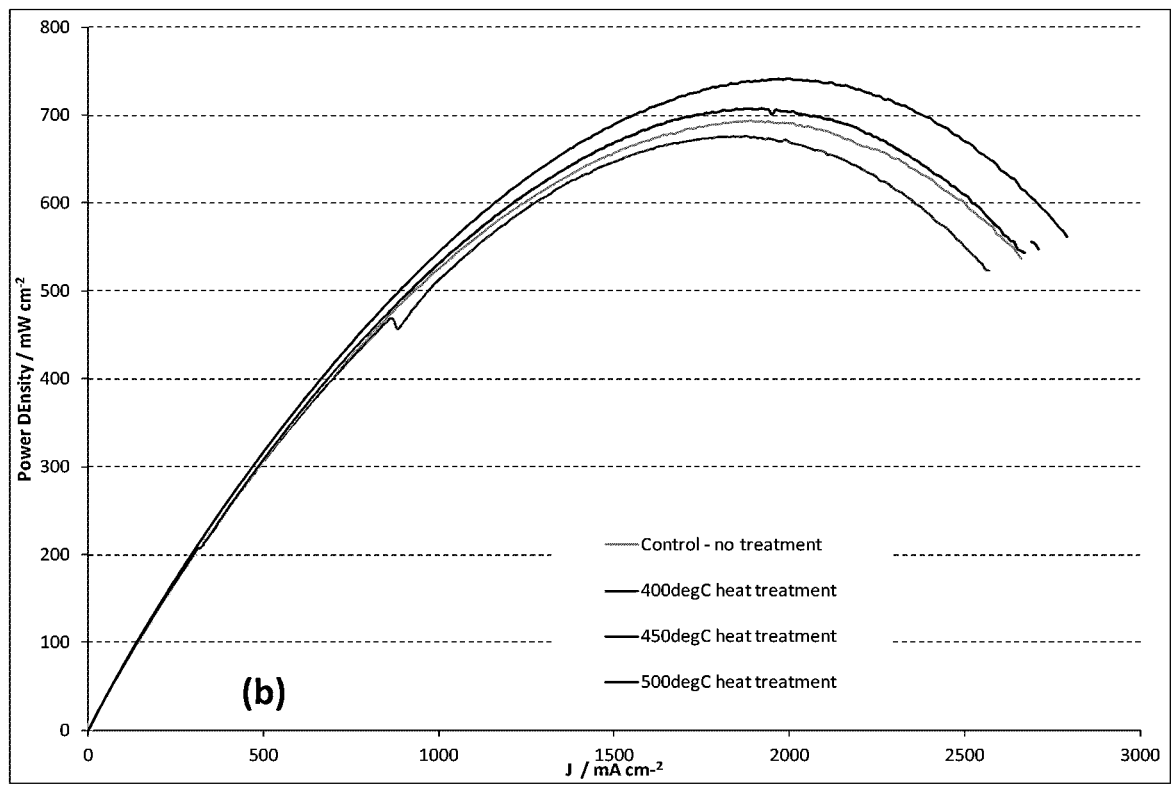
Figure 8:
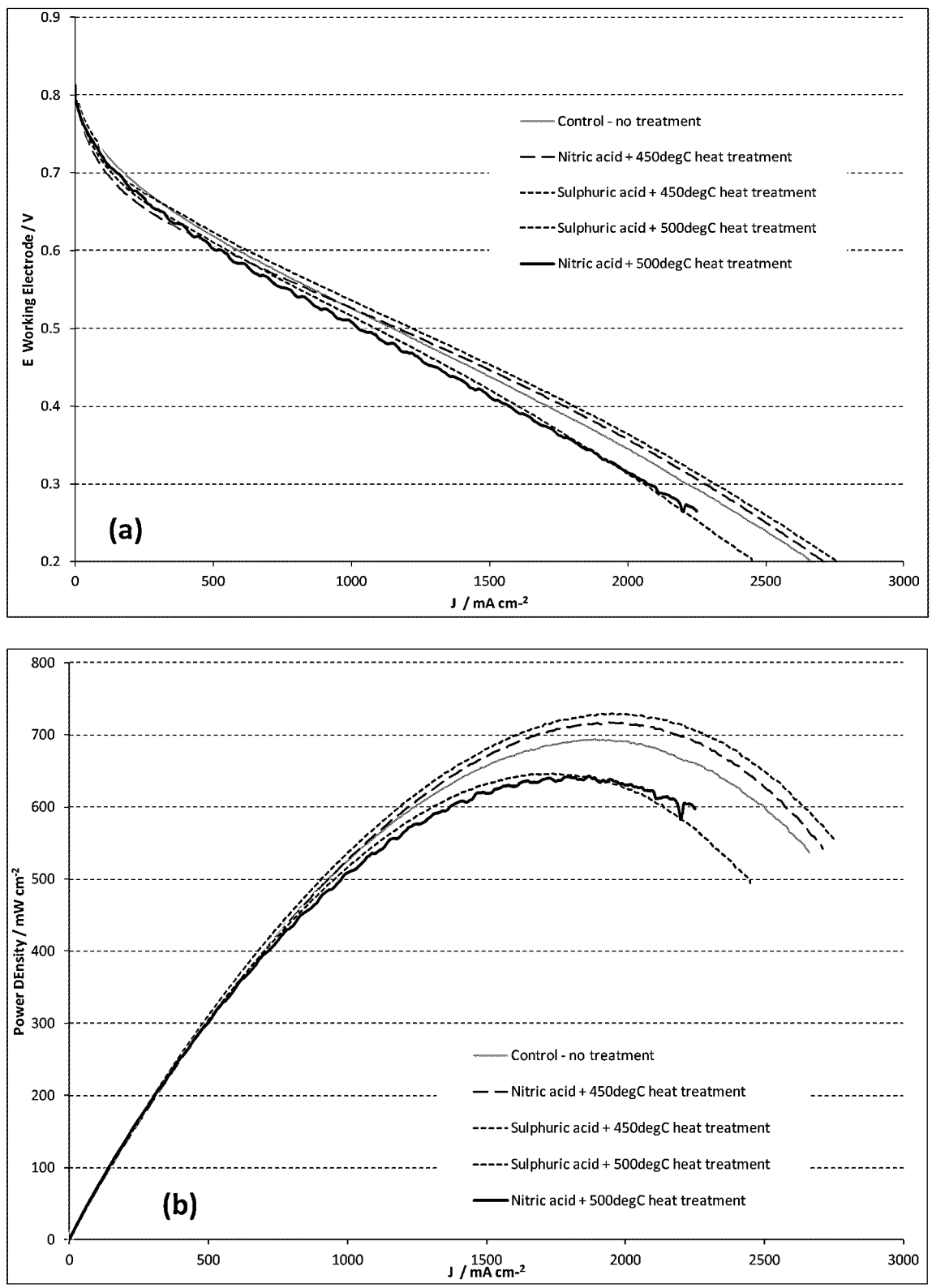
Figure 9:
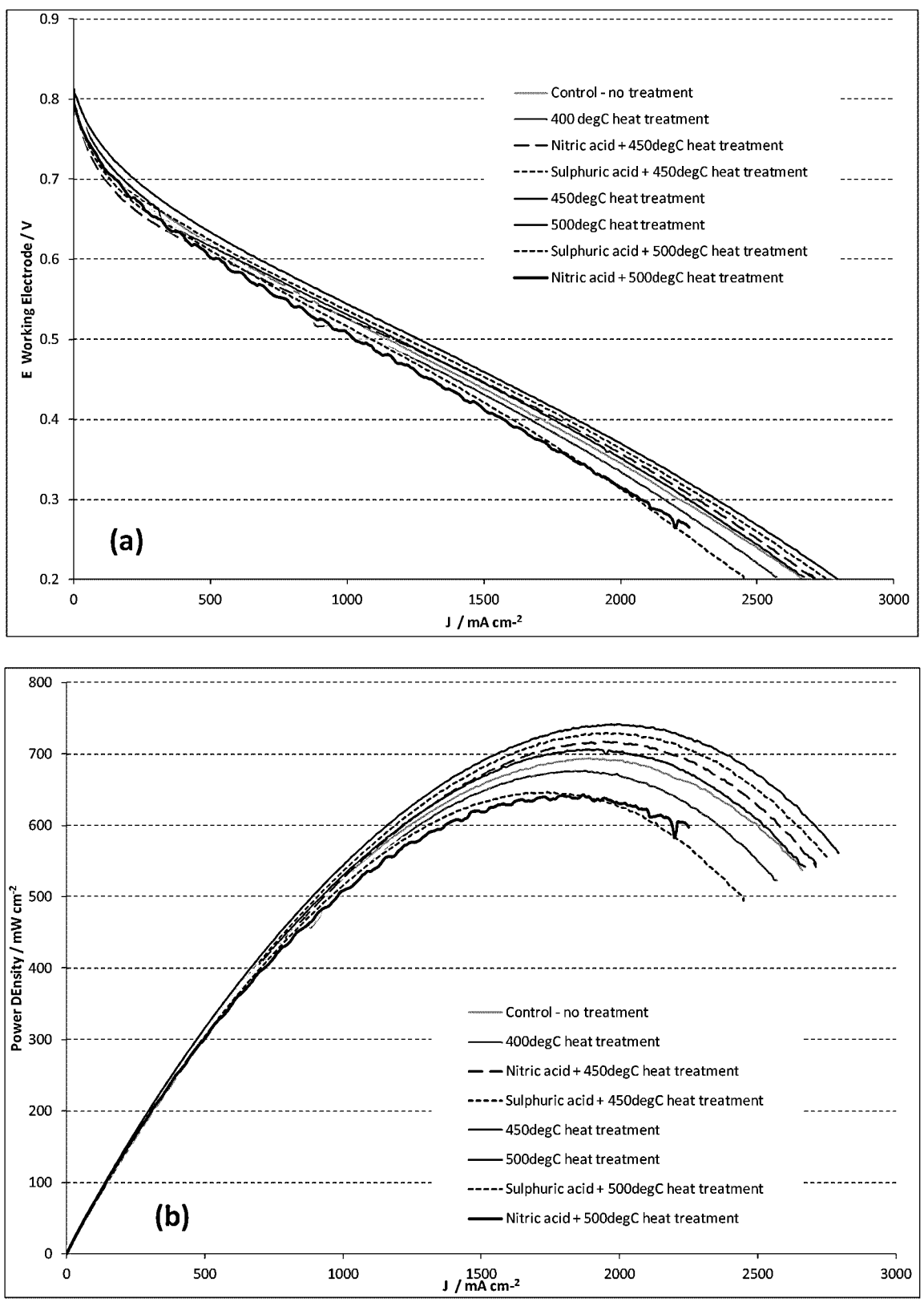
Figure 10:
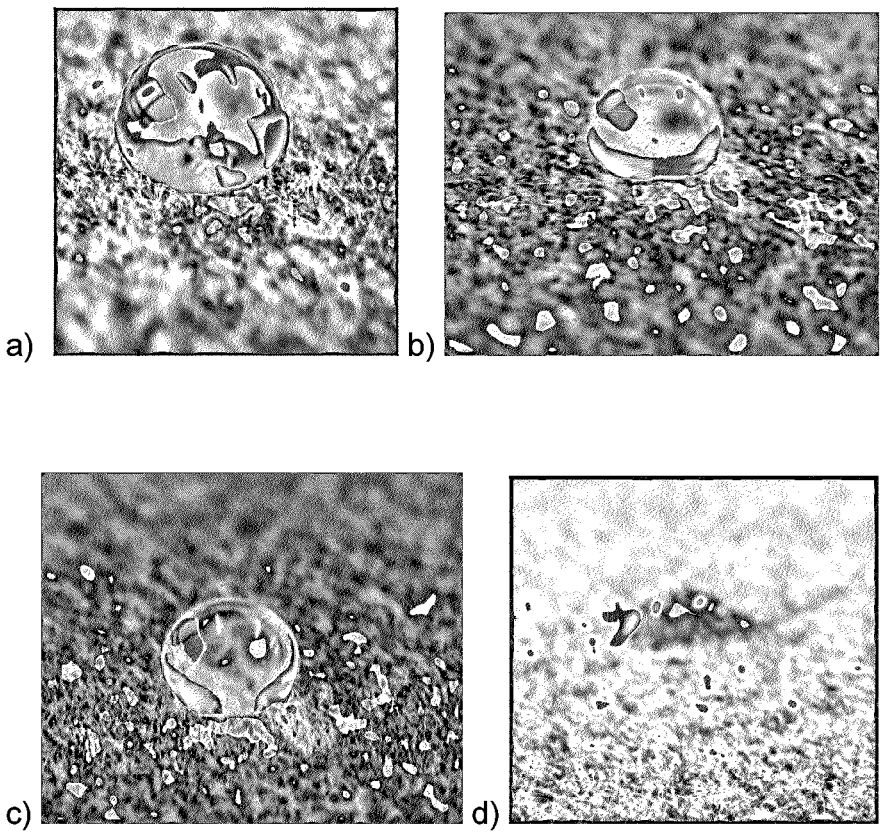
Figure 11:
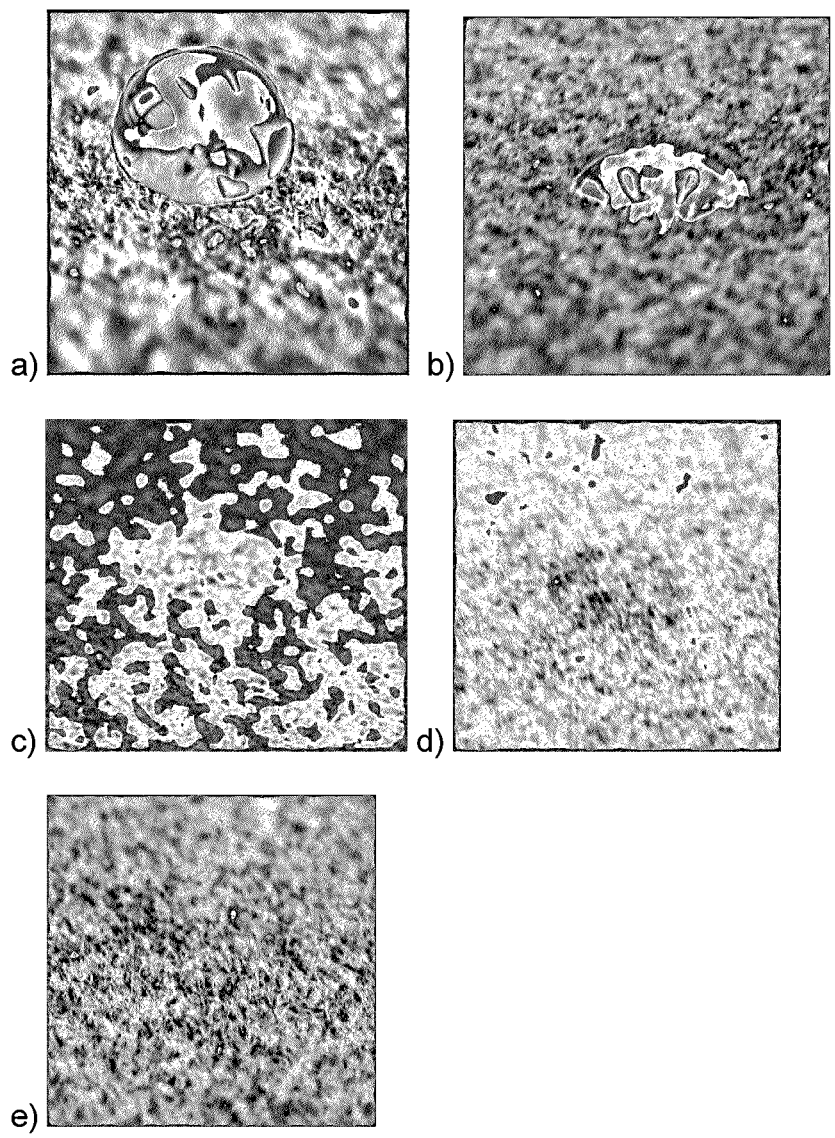
Figure 12:
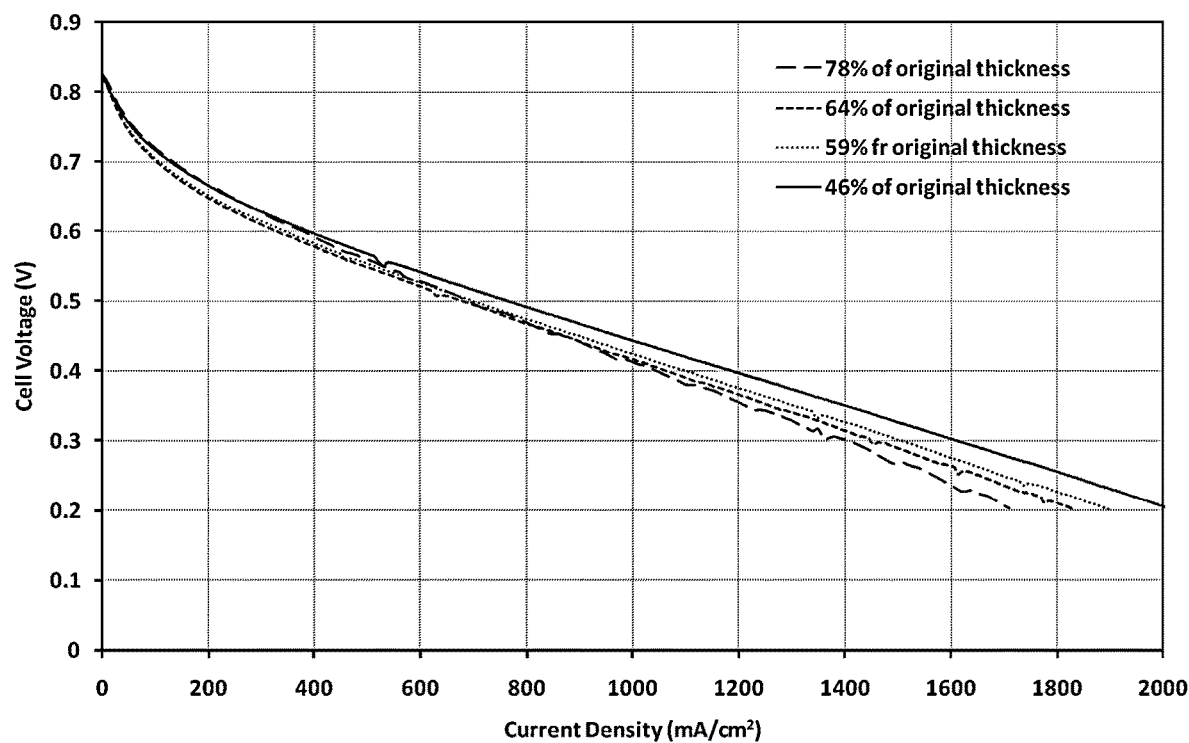
Figure 13:
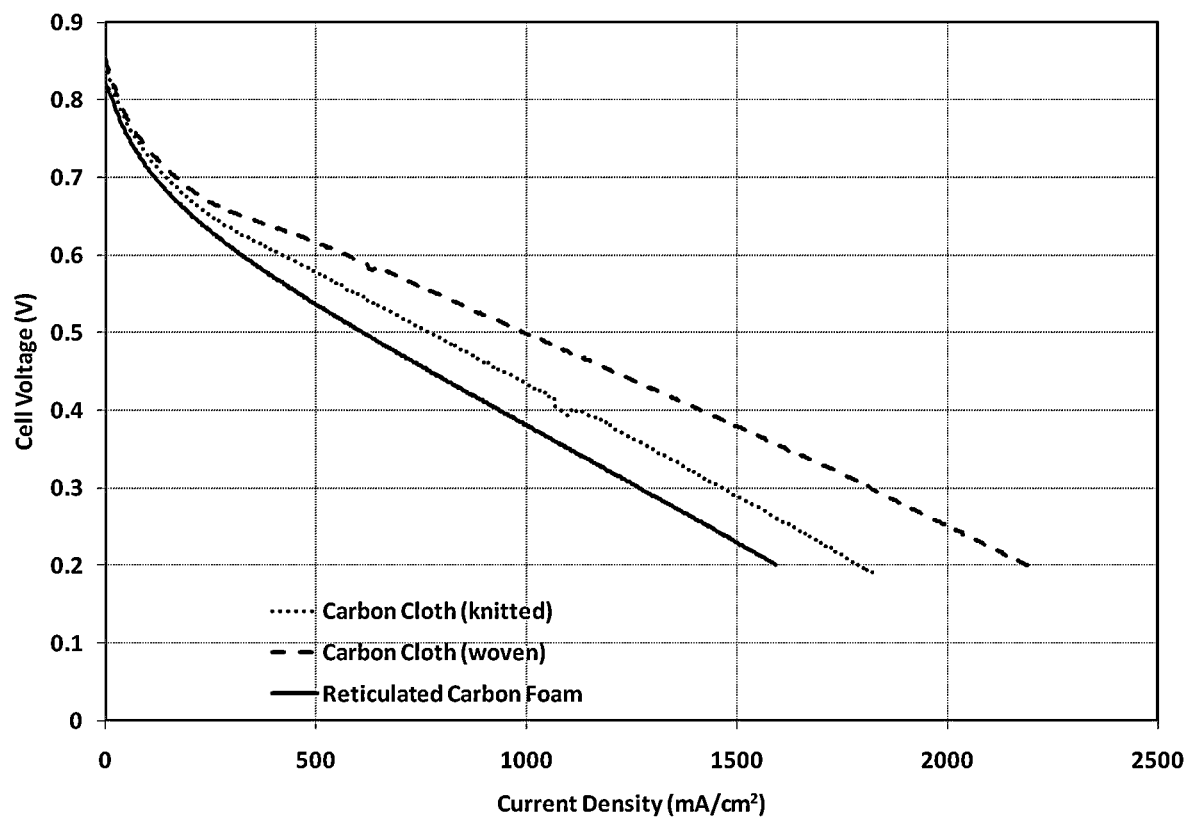

FIG. 7 illustrates charts which compare the performance (using the polarisation curve and the power density curve), at an open circuit voltage of 0.80V, of a control cell with that of fuel cells having an electrode that has undergone a prior heat treatment process to increase the proportion of active reaction sites on the electrode surface and formed in accordance with an embodiment of the present invention;

FIG. 8 illustrates charts which compare the performance (using the polarisation curve and the power density curve), at an open circuit voltage of 0.80V, of a control cell with fuel cells having an electrode that has undergone a prior treatment process of soaking in nitric or sulphuric acid followed by heat treatment to increase the proportion of active reaction sites on the electrode surface and formed in accordance with an embodiment of the present invention;

FIG. 9 illustrates charts which compare the performance (using the polarisation curve and the power density curve), at an open circuit voltage of 0.80V, of a control cell with fuel cells having an electrode that has undergone a prior treatment process of soaking in nitric or sulphuric acid followed by heat treatment and fuel cells having an electrode that has undergone prior heat treatment alone to increase the proportion of active reaction sites on the electrode surface and formed in accordance with an embodiment of the present invention;

FIG. 10 illustrates the differing hydrophilicity of a control graphitic felt cathode electrode and graphitic felt cathode electrodes that have undergone heat treatment in accordance with an embodiment of the present invention;

FIG. 11 illustrates the differing hydrophilicity of a control graphitic felt cathode electrode and graphitic felt cathode electrodes that have undergone acid and heat treatment in accordance with an embodiment of the present invention;

FIG. 12 illustrates the change in performance of the cathode of the present invention on compression; and FIG. 13 illustrates the performance of cathodes according to the present invention in comparison to those of the prior art, as well as demonstrating the change in performance with changing the weave of a carbon cloth electrode.

Figure 1:
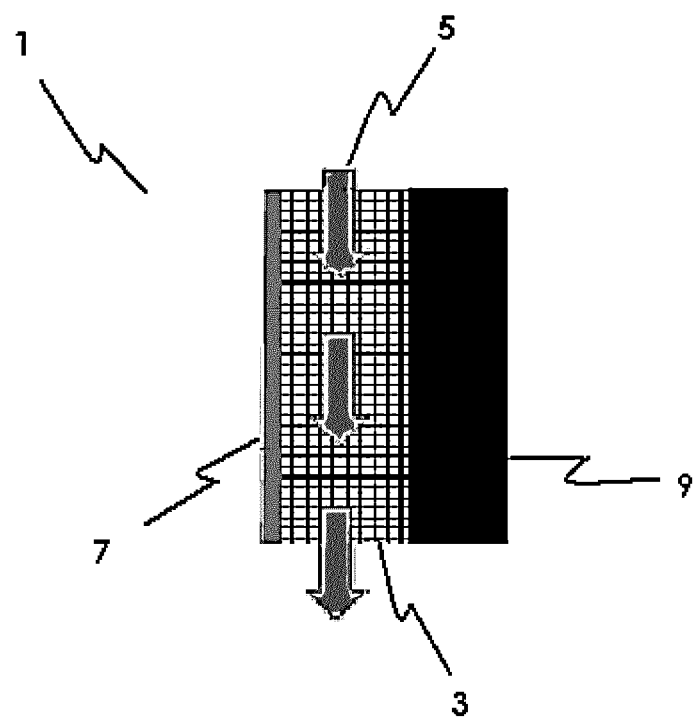
FIG. 1 illustrates a side elevation of a porous skeletal medium situated between a polymer electrolyte membrane and a bipolar plate.
Figure 2:
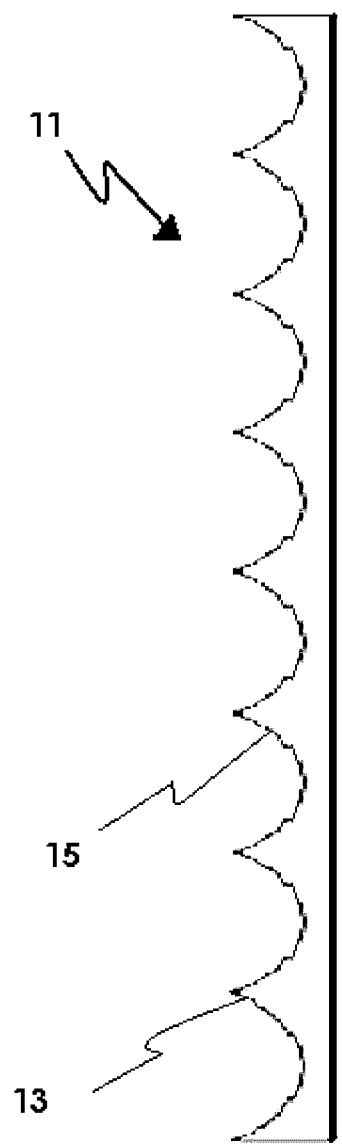
FIG. 2 is a partial side elevation of a porous skeletal medium formed in accordance with the present invention having a surface modified for enhanced electrochemical reactivity.

With reference to FIG. 2, there is illustrated a side elevation of a porous skeletal medium generally indicated 11. The surface 13 of the porous skeletal medium 11 is configured such that it takes the form of recurring hemispherical indentations therealong. Each hemispherical indentation is referenced 15, for instance. The hemispherical indentations 15, in this embodiment, abut one another. The hemispherical indentations 15 constitute the modification of the surface 13 of the porous skeletal medium 11. The surface 13 has, therefore, been modified to induce enhance activated behaviour. In this way, an electrode formed in this manner would exhibit superior electrochemical performance in terms of enhanced surface area of the reactants such as protons and oxygen to generate greater amounts of electrical current per unit volume.

Figure 3:
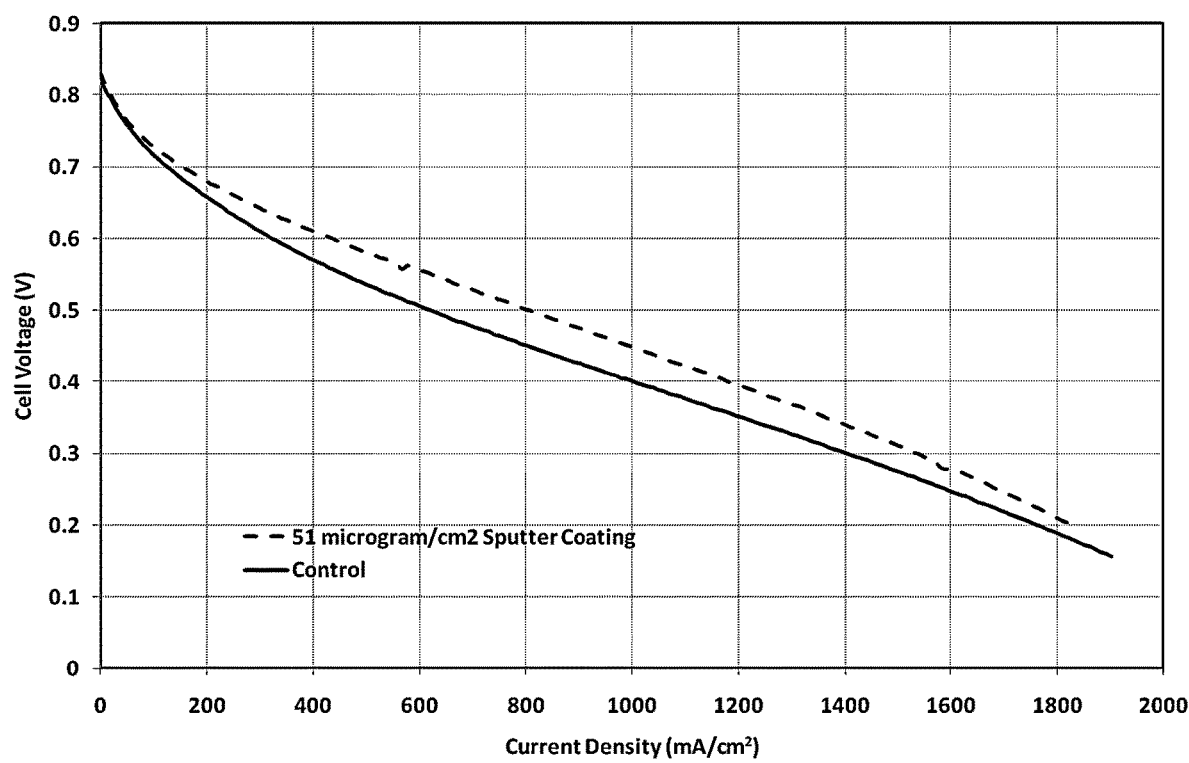
FIG. 3 illustrates a chart which compares the fuel cell performance of a control cell with a fuel cell having an electrode which has undergone a sputter-coating treatment in accordance with an embodiment of the present invention.

Referring now to FIG. 3, there is illustrated a chart which makes a direct comparison of a fuel cell having an unmodified RVC cathode electrode, and a fuel cell having a similar RVC electrode that has undergone a sputter-coating treatment. In both cases the cathode was 5 times compressed 100 pores per inch RVC of dimensions 50×63×2 mm (this RVC electrode was further modified, as discussed, for the dashed line in FIG. 3). A standard gas diffusion layer (carbon paper approximately 0.3 mm thick) was placed between the bipolar plate and the RVC electrode to increase the conductivity of the connection. A carbon veil (10 g/m$^2$) was placed between the RVC electrode and the membrane. The membrane was a commercially available membrane electrode assembly of membrane thickness 50 microns and active area 50×50 mm with an anode catalyst loading of 0.3 mg Pt cm$^{-2}$. A polyoxometallate catholyte was used (0.3 molar solution of Na4H3[PMo8V4O40].(H2O)$_x$ in water), with a catholyte flow of 240 ml/min and a cell temperature of 79-86° C. A standard gas diffusion layer of approximate thickness 0.3 mm was used in the anode compartment. The hydrogen pressure in the anode compartment was 1.5-2 bar absolute. The results of the control fuel cell are shown by the solid line, while the results of the fuel cell having a cathode electrode formed in accordance with an embodiment of the present invention are shown with the dashed line. The experimental cathode electrode was formed by depositing 51 μg/cm$^2$ carbon material at 0V acceleration. Operating conditions, other fuel cell components and the catholyte solution used were otherwise identical. As can be seen in the dashed polarisation curve, the performance of the sputter-coated sample is significantly superior (a higher cell voltage for a given current) compared with the control sample indicated by the solid polarisation curve.

Figure 4:
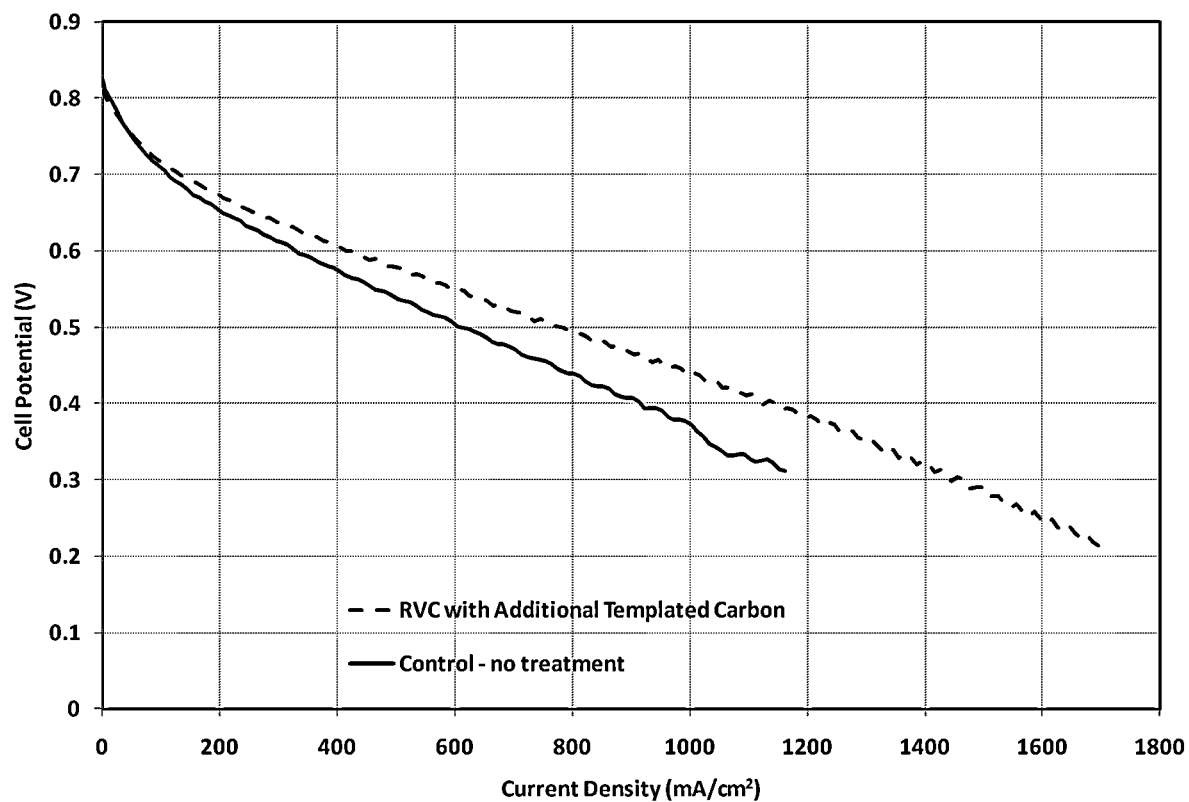
FIG. 4 illustrates a chart which compares the fuel cell performance of a control cell with a fuel cell having an electrode that has undergone a treatment process using a template to add additional high surface area carbon thereto formed in accordance with an embodiment of the present invention.

Referring now to FIG. 4, a similar chart is illustrated to that shown in FIG. 3. However, in this figure, there is shown a direct comparison of the fuel cell performance of a control cell having an unmodified RVC cathode electrode, with a fuel cell having a similar RVC electrode but which has undergone a treatment process using a template to add additional high surface area carbon to the existing RVC support structure (porous skeletal medium). Operating conditions, other fuel cell components and the catholyte solution used were otherwise identical to those in FIG. 3. As can be seen from the dashed polarisation curve, the performance of the experimental sample with the additional templated carbon is significantly superior (a higher cell voltage for a given current) compared with the control sample indicated by the solid polarisation curve.

Figure 5:
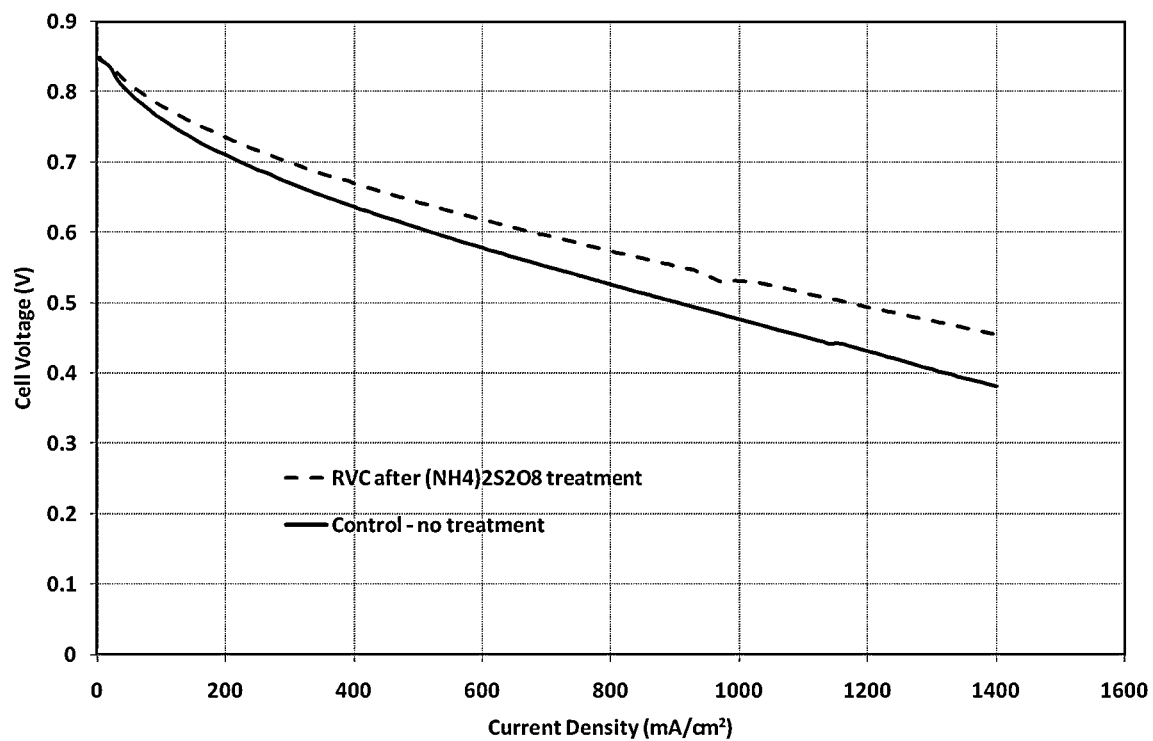
FIG. 5 illustrates a chart which compares the fuel cell performance of a control cell with a fuel cell having an electrode that has undergone a prior treatment process using an oxidising agent to increase reaction sites on the surface and formed in accordance with an embodiment of the present invention.

FIG. 5 charts the results of a further test which compares the fuel cell performance of a control cell having an unmodified RVC cathode electrode with a fuel cell having a similar RVC electrode but which has undergone a prior treatment process using an oxidising agent. The oxidising agent in this embodiment is an ammonium persulfate (($NH_4)_2S_2O_8$) treatment solution used in order to increase the proportion of active reaction sites on the electrochemical surface. Operating conditions, fuel cell components and the catholyte solution used throughout were otherwise identical to those in FIG. 3 except the membrane was a commercially available membrane electrode assembly of membrane thickness 25 microns with an anode catalyst loading of 0.4 mg Pt cm$^{-2}$. As can be seen from the dashed polarisation curve, the performance of the experimental sample that has undergone prior electrode treatment is significantly superior (a higher cell voltage for given current) compared with the control sample indicated by the solid polarisation curve.

Figure 6:
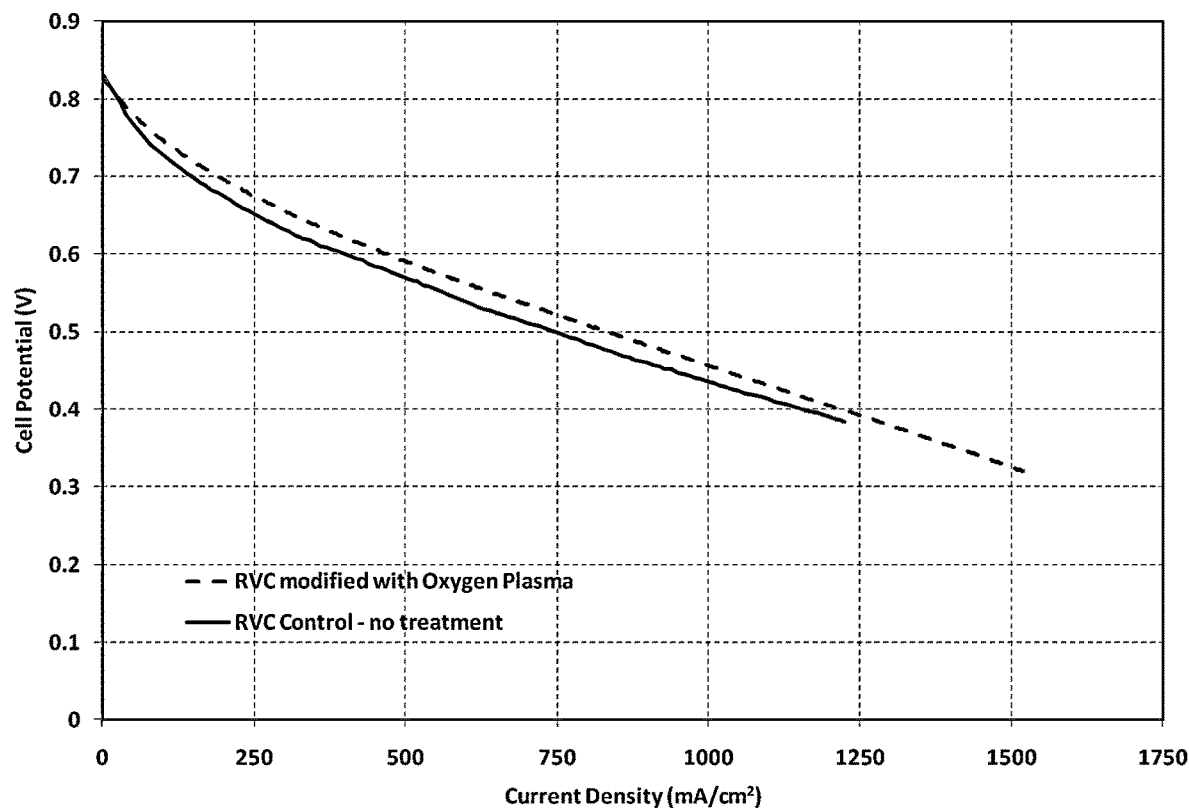
FIG. 6 illustrates a chart which compares the fuel cell performance of a control cell with a fuel cell having an electrode that has undergone a prior treatment process using gas-phase chemical modification to increase the proportion of active reaction sites on the electrode surface and formed in accordance with an embodiment of the present invention.

FIG. 6 also illustrates a further example of an experiment in which the fuel cell performance of a control cell having an unmodified RVC cathode electrode is compared with the performance of a fuel cell having a similar RVC electrode that has undergone a prior treatment process using an oxygen plasma treatment in order to increase the proportion of the active sites of the electrode surface. Operating conditions, other fuel cell components and the catholyte selection used were otherwise identical to those in FIG. 5. As can be seen from the dashed polarisation curve, the performance of the sample that has undergone prior electrode treatment is significantly superior (a higher cell voltage for a given current) compared with the control sample indicated by the solid polarisation curve.

FIG. 7 illustrates the results of a test which compares the performance, at an open circuit voltage of 0.80V, of a control cell having an unmodified graphitic felt cathode electrode with that of fuel cells having similar graphitic felt electrodes but which have undergone a prior heat treatment at 400° C., 450° C. or 500° C. for 2 hours (in air). In all cases, the graphite felt electrode was a 50×63 mm polyacrylonitrile graphitic felt of thickness 2.5 mm, which was compressed to 1.1 mm during the cell build. The cathode electrode was fixed next to a commercially available membrane electrode assembly with an active area of 50×50 mm and membrane thickness 15 microns with an anode catalyst loading of 0.3 mg Pt $cm^{-2}$. A polyoxometallate catholyte was used (0.3 molar solution of $Na_4H_3[PMo_8V_4O_{40}].(H_2O)_x$ in water), with a catholyte flow of 160 ml/min and a cell temperature of 75-80° C. A standard gas diffusion layer (carbon paper) of approximate thickness 0.3 mm was used in the anode compartment. The hydrogen pressure in the anode compartment was 1.5-2 bar absolute. The treatment in this embodiment is used in order to increase the proportion of active reaction sites on the electrochemical surface. Operating conditions, fuel components and the catholyte solution used throughout were otherwise identical. FIG. 7a illustrates the polarisation curves resulting from the experiments, while FIG. 7b shows the power density curves. As can be seen from the figures, the performance of the experimental samples that have undergone prior electrode treatment at 450° C. or 500° C. is superior (a higher cell voltage/power density for given current) at 0.80V compared with the control sample. The performance after treatment at 500° C. is significantly superior. However, the sample at 400° C. did not show an improvement. This demonstrates that the heat treatment must be tailored to the specific material. Without wishing to be bound by theory, it is thought that 400° C. is too low a temperature to activate the surface of the graphitic felt and so the temperature at which the material is treated should be carefully selected so as to result in an improved performance.

FIG. 8 illustrates the results of a further test which compares the fuel cell performance, at an open circuit voltage of 0.80V, of a control cell having an unmodified graphitic felt cathode electrode with fuel cells having similar graphitic felt electrodes but which have undergone a multiple pre-treatment process. In all cases, the graphite felt electrode was a 50×63 mm polyacrylonitrile graphitic felt of thickness 2.5 mm, which was compressed to 1.1 mm during the cell build. The cathode electrode was fixed next to a commercially available membrane electrode assembly with an active area of 50×50 mm and membrane thickness 15 microns with an anode catalyst loading of 0.3 mg Pt $cm^{-2}$. Initially, the treated electrodes were left to soak in concentrated nitric or sulphuric acid for 5 hours at room temperature, followed by thorough rinsing. The modified felts were then heated at 450° C. or 500° C. for 2 hours (in air). A polyoxometallate catholyte was used (0.3 molar solution of $Na_4H_3[PMo_8V_4O_{40}].(H_2O)_x$ in water), with a catholyte flow of 160 ml/min and a cell temperature of 75-80° C. A standard gas diffusion layer (carbon paper) of approximate thickness 0.3 mm was used in the anode compartment. The hydrogen pressure in the anode compartment was 1.5-2 bar absolute. The treatment in this embodiment is used in order to increase the proportion of active reaction sites on the electrochemical surface. Operating conditions, fuel components and the catholyte solution used throughout were otherwise identical. FIG. 8a illustrates the polarisation curves resulting from the experiments, while FIG. 8b shows the power density curves. As can be seen from the figures, the performance of the experimental samples that have undergone prior electrode treatment at 450° C. is significantly superior (a higher cell voltage/power density for given current) compared with the control sample. However, treatment at 500° C. resulted in a lower performance. Once again, this demonstrates the importance of selecting the conditions with reference to the material used.

FIG. 9 is a combination of the graphs shown in FIGS. 7 and 8, comparing the performance of the heat treatment alone to that of the heat treatment in combination with acid treatment. As can be seen from the graphs, heat treatment at 450° C. in combination with acid treatment improves performance of a fuel cell more than heat treatment alone.

FIGS. 10 and 11 illustrate the differing hydrophilicity of the graphitic felt cathode electrodes with the treatments discussed above. FIG. 10a shows a control sample, FIG. 10b is a sample after treatment at 400° C., FIG. 10c is a sample after treatment at 450° C. and FIG. 10d is a sample after treatment at 500° C. FIG. 11a shows a control sample, FIG. 11b is a sample after treatment with sulphuric acid and heat treatment at 450° C., FIG. 11c is a sample after treatment with nitric acid and heat treatment at 450° C., FIG. 11d is a sample after treatment with sulphuric acid and heat treatment at 500° C. and FIG. 11e is a sample after treatment with nitric acid and heat treatment at 500° C. A drop of water was added from a pipette and the photographs were taken after 60 seconds for FIGS. 10 and 11a. A drop of water was added from a pipette and the photographs were taken after 1 second for FIGS. 11b, 11c, 11d and 11e. It appears that the wettability (hydrophilic nature) of the treated cathode surface was found to be higher than the untreated cathode surface. This provides a benefit, as felts with an increased wettability would be easier to pump the catholyte solution through, which would result in a more efficient fuel cell by reducing the pressure required to pump the catholyte, thereby reducing a parasitic loss. Further, these figures suggest that there may be an optimum wettability to be obtained with treatment of graphitic felt. The felt of FIG. 10d showed the best performance (see FIG. 7) as did the felt of FIG. 11b (see FIG. 8). A wettability between these two felts therefore may exemplify an optimum, with an increase or a decrease from this level being detrimental to the performance of the felt.

FIG. 12 shows the performance data (polarisation curves) for fuel cells of the present invention operating using graphitic felt electrodes at different compression ratios. In all cases, the graphite felt electrode was a 50×63 mm polyacrylonitrile graphitic felt of thickness 2.5 mm, which was compressed to smaller thicknesses during the experiment (the percentage compression is given in the figure legend). The cathode electrode was fixed next to a commercially available membrane electrode assembly with active an area of 50×50 mm and membrane thickness 25 microns with an anode catalyst loading of 0.4 mg Pt $cm^{-2}$. A polyoxometallate catholyte was used (0.3 molar solution of $Na_4H_3[PMo_8V_4O_{40}].(H_2O)_x$ in water), with a catholyte flow of 240 ml/min and a cell temperature of 79-82° C. A standard gas diffusion layer (carbon paper) of approximate thickness 0.3 mm was used in the anode compartment. The hydrogen pressure in the anode compartment was approximately 2 bar absolute. The fuel cell was run at different cathode compressions and the performance monitored. As shown in FIG. 12, the performance improves as the compression increases, with the best performance being seen for a felt compressed to 46% of its original thickness.

FIG. 13 shows the performance data (polarisation curves) for fuel cells of the present invention operating using carbon cloth electrodes, with a thickness of approximately 0.5 mm, compared to a 2 mm thick reticulated vitreous carbon electrode. The cathode compartment for the RVC electrode was similar to that described in FIG. 3. The knitted carbon cloth was originally 0.47 mm thick. On building the fuel cell, this electrode was placed next to the membrane and compressed to 0.35 mm. The woven carbon cloth was originally 0.528 mm thick. On building the fuel cell, this electrode was placed next to the membrane and compressed to 0.35 mm. For all fuel cells in FIG. 13, the membrane was a commercially available electrode membrane assembly of active area 50×50 mm and membrane thickness 25 microns with an anode catalyst loading of 0.4 mg Pt cm$^{-2}$. A standard gas diffusion layer (carbon paper) of approximate thickness 0.3 mm was used in the anode compartment. The hydrogen pressure in the anode compartment was approximately 2 bar absolute. A polyoxometallate catholyte was used (0.3 molar solution of $Na_4H_3[PMo_8V_4O_{40}]\cdot(H_2O)_x$ in water), with a catholyte flow of 240, 156 and 180 ml/min for the RVC, woven carbon cloth and knitted carbon cloth electrodes, respectively. The cell temperature was 79-82° C. FIG. 13 demonstrates the increased performance of the cathodes of the present invention compared to that of the prior art. Further, FIG. 13 also demonstrates the increase in performance of a woven cloth electrode, compared to a knitted cloth electrode. This therefore shows that the weave of the cloth material can be tailored to the requirements of the fuel cell.

What is claimed is:

1. A redox fuel cell cathode electrode comprising a compressed porous metal structure comprising a modified surface, comprising at least one increased surface area zone,
   wherein the modified surface is selected from the group consisting of:
      a) a surface comprising a coating of sputtered carbon;
      b) a surface comprising chemical vapor deposited carbon; and
      c) a surface comprising chemical vapor infiltrated carbon,
   wherein the surface of the porous metal structure comprises a further modification, the modified surface comprising:
      a) a region of increased electrochemical reactive sites per unit surface area;
      b) a liquid chemical modified surface; or
      c) an oxidized region, and
      wherein the porous metal structure in the electrode has a thickness of less than 80% of its original, uncompressed thickness.

2. The cathode electrode of claim 1, wherein the at least one oxidized region is provided by exposure of the surface of the porous metal structure to a strong acid or a strong oxidizing agent.

3. The cathode electrode of claim 1, wherein the surface of the porous metal structure comprises a further surface modification selected from the group consisting of:
   a) plasma etching;
   b) heat treatment; and
   c) oxygen plasma treatment.

4. The cathode electrode of claim 1, wherein the porous metal structure is compressible.

5. The cathode electrode of claim 1, wherein the porous metal structure has a property selected from the group consisting of:
   a) a thickness of no more than 2 mm;
   b) a specific surface area from 600 to 30000 $cm^2/cm^3$;
   c) a through-plane electrical resistance of no more than 17 $m\Omega cm^2$;
   d) stability in an oxidizing environment of pH 0 at 80° C.;
   e) a pore structure permeability of at least $5\times10^{11}$ $m^2$; and
   f) stability at elevated pressures.

6. The cathode electrode of claim 1, wherein the surface of the porous metal structure comprises a modification with a material, the material having a property selected from the group consisting of:
   a) a thickness of no more than 2 mm;
   b) a specific surface area from 600 to 30000 $cm^2/cm^3$;
   c) a through-plane electrical resistance of no more than 17 $m\Omega cm^2$;
   d) stability in an oxidizing environment of pH 0 at 80° C.;
   e) a pore structure permeability of at least $5\times10^{11}$ $m^2$; and
   f) stability at elevated pressures.

7. The cathode electrode of claim 1, wherein a portion of the surface of the porous metal structure is unmodified, the unmodified portion being reactive to a catholyte liquid.

8. The cathode electrode of claim 1, wherein the modified surface of the porous metal structure is hydrophilic such that the cathode electrode has increased wettability.

9. A redox fuel cell comprising a cathode electrode according to claim 1.

10. An engine, electronic device or power supply unit comprising the fuel cell of claim 9.

11. A method of manufacturing a redox fuel cell cathode electrode, the method comprising the steps of:
   providing a porous metal structure;
   modifying the surface of the porous metal structure to induce enhanced activated behavior;
   and compressing the porous metal structure to less than 80% of its original thickness;
   wherein the step of modifying the surface of the porous metal structure comprises increasing the surface area for a given volume of the electrode through the provision of at least one increased surface area zone;
   wherein the surface modification of the porous metal structure is a modification selected from the group consisting of:
      a) sputter coating of carbon;
      b) chemical vapor deposition of carbon;
      c) chemical vapor infiltration of carbon, wherein the surface modification of the porous metal structure comprises a further modification selected from the group consisting of:
         a) provision of a region of increased electrochemical reactive sites per unit surface area;
         b) liquid chemical modification; and
         c) provision of at least one oxidized region.

12. The method of claim 11, wherein the step of modifying the surface of the porous metal structure comprises a further surface modification selected from the group consisting of:
   a) plasma etching;
   b) heat treatment; and
   c) oxygen plasma treatment.

* * * * *